United States Patent

Knudson et al.

[15] 3,671,788
[45] June 20, 1972

[54] REGULATABLE ALTERNATOR

[72] Inventors: Louis I. Knudson; Richard C. Frink, both of Norwich; Charles H. White, Earlville, all of N.Y.

[73] Assignee: General Laboratory Associates, Inc., Norwich, N.Y.

[22] Filed: Nov. 30, 1970

[21] Appl. No.: 93,582

[52] U.S. Cl............................310/156, 310/210, 322/51, 322/57
[51] Int. Cl..........................................................H02k 21/14
[58] Field of Search ................322/51, 52, 57; 310/179, 156, 310/210

[56] References Cited

UNITED STATES PATENTS

| | | | |
|---|---|---|---|
| 3,396,325 | 8/1968 | Hopkins | 322/51 X |
| 2,939,069 | 5/1960 | Dvoracek | 322/52 X |

FOREIGN PATENTS OR APPLICATIONS

| | | | |
|---|---|---|---|
| 1,224,996 | 6/1960 | France | 310/156 |

*Primary Examiner*—Lewis H. Myers
*Assistant Examiner*—H. Huberfeld
*Attorney*—Lester W. Clark, Robert S. Dunham, P. E. Henninger, Thomas F. Moran, Gerald W. Griffin, R. Bradlee Boal, Christopher C. Dunham and Robert Scobey

[57] ABSTRACT

An alternator comprising a permanent magnet rotor constructed to retain circumferentially polarized permanent magnets in place without substantial stress on the magnet material.

A stator cooperating with the rotor is constructed to permit regulation of the alternator output by the use of a control winding which may saturate part of the magnetic circuit in the stator.

The magnetic structure of the stator includes an annular magnetic circuit means with inwardly projecting teeth. Each tooth is separated into at least two axially separated radial branches. The annular magnetic circuit means and the teeth define magnetic return circuits for the flux from the poles on the rotor. Each pair of axially spaced tooth branches is bridged at its inner and outer ends by magnetic members, which together with the two tooth sections define a magnetic loop circuit. The control winding encircles the stator inside the magnetic loop circuits. Application of current to the control winding produces a flux which cooperates with the alternating flux from the rotor pole to saturate one of the two parallel teeth, while leaving the other unsaturated. Thus, the saturation and hence the reluctance of the magnetic circuit in the stator is controlled but there is always present an unsaturated magnetic return circuit interrupted only by the air gaps at the stator periphery.

12 Claims, 9 Drawing Figures

PATENTED JUN 20 1972
3,671,788
SHEET 1 OF 4
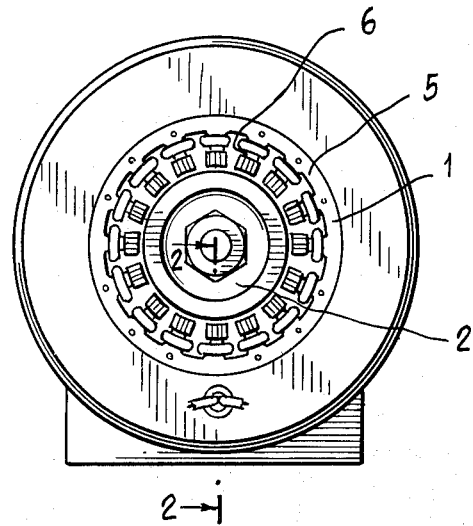
Fig. 1.
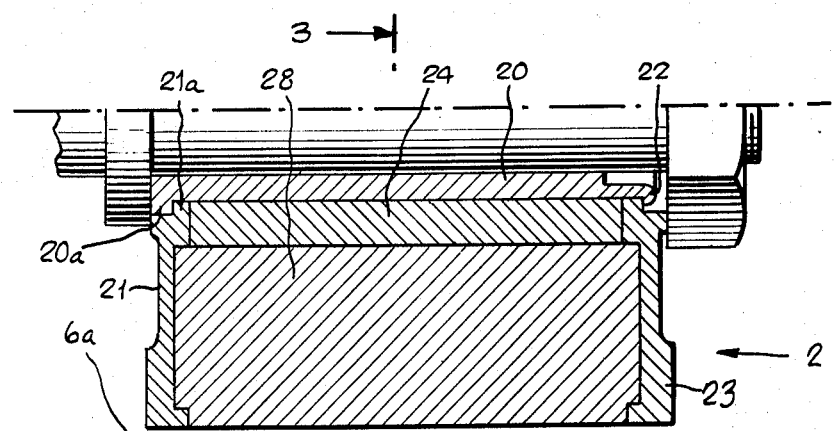
Fig. 2.
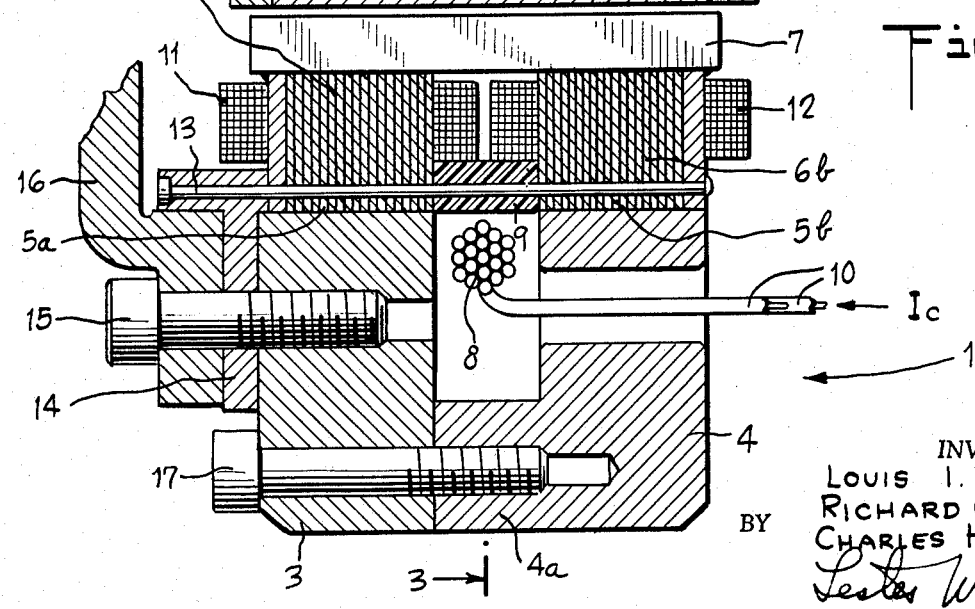
INVENTORS
LOUIS I. KNUDSON
RICHARD C. FRINK
CHARLES H. WHITE
BY Lester W Clark
ATTORNEY MAIN FLUX PATH
WITH $I_c = 0$
→

FLUX PATH OF
CONTROL FIELD $I_c$
- - - - - - - →

MAIN FLUX PATH
WITH $+I_c$ MAX.
++++++++++→

REGULATABLE ALTERNATOR

BACKGROUND OF THE INVENTION

Permanent magnet alternators or generators are commonly driven by prime movers which are subject to considerable variations in speed, such as internal combustion engines. The output of such an alternator or generator is inherently directedly affected by the speed at which it is operated. It is therefore necessary to provide some additional control for the output, since commonly the load which must be supplied by the alternator or generator is not related to the speed at which the generator is running.

Attempts have been made to construct an alternator which could be controlled by saturating the magnetic return circuit in the stator. See for example, the patent to Brainard, U.S. Pat. No. 2,564,320. Brainard shows a control winding which encircles the entire magnetic return circuit in the stator. When that return circuit is saturated by the control winding, the flux from the permanent magnet rotor is reduced by the increase in the effective reluctance of the return circuit.

BRIEF SUMMARY OF THE INVENTION

An alternator constructed in accordance with the invention comprises a permanent magnet rotor and a cooperating stator. The rotor comprises circumferentially polarized permanent magnets held in place by segments between the magnets and retaining bars located radially outward of the magnets. The assembly is held together by end plates having their margins rolled over the segments and retaining bars. The construction distributes compressive stresses on the magnets so that the stresses are not localized and permits the use of magnetic material selected for their magnetic properties rather than their physical properties.

The stator is constructed to permit regulation of the alternator output by means of a control winding which may saturate part of the magnetic circuit in the stator. The stator includes a plurality of radially inwardly projecting teeth, each tooth comprising a set of at least two axially spaced parallel radial branches, and a pair of branches connecting the ends of the parallel radial branches. The control winding is located between the parallel radial branches and encircles the rotor. The return circuit for the alternating flux from the rotating permanent magnet field extends through the teeth and through an annulus connecting the outer ends of all the teeth. This alternating flux extends in the same direction in all the parallel branches of any one set, at any instant. The flux due to the current in the control winding extends through a loop circuit in one radial direction through one branch of a set and in the opposite direction through the other branch. The radial branches are proportioned so that those branches carrying both fluxes in the same direction may become saturated when the control flux is supplied. The branch where the fluxes are opposed do not become saturated. Hence the effective reluctance of the stator to the alternating flux from the rotor may be varied by changing the current in the control winding so as to regulate the alternator output.

In the structure described, only a portion of the magnetic return circuit in the stator is saturated by the action of the control winding. Hence there always exists an unsaturated magnetic return circuit in the stator for the flux from the permanent magnet rotor. The amount of energy expended in the control winding is thereby reduced, and the energy required to turn the rotor is also reduced, both contributing to a resultant increase in efficiency of the alternator at outputs below the maximum.

IN THE DRAWINGS

FIG. 1 is an elevational end view of an alternator embodying the invention.

FIG. 2 is a cross-sectional view on an enlarged scale, on the line 2—2 of FIG. 1, showing the stator and rotor construction.

DETAILED DESCRIPTION FIGS. 1–3

Figure 3:
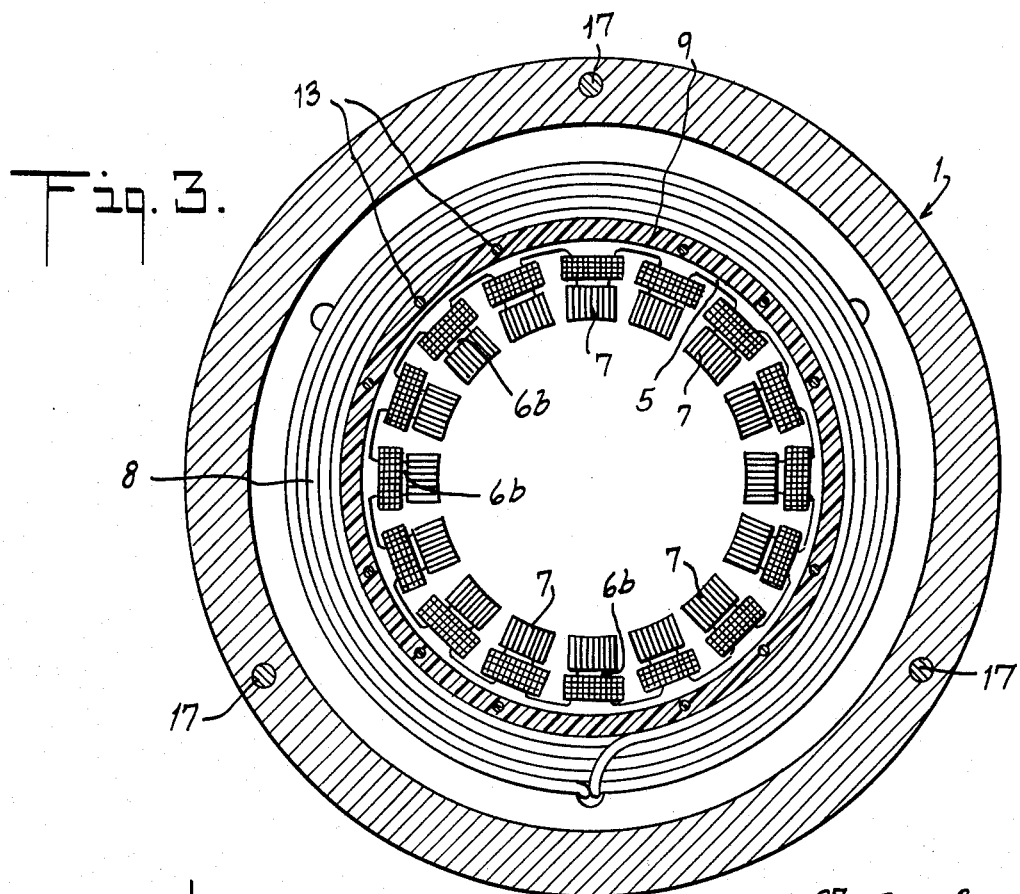
FIG. 3 is a sectional view on the line 3—3 of FIG. 2, on a smaller scale, and showing the full periphery of the stator, but omitting the rotor.
Figure 4:
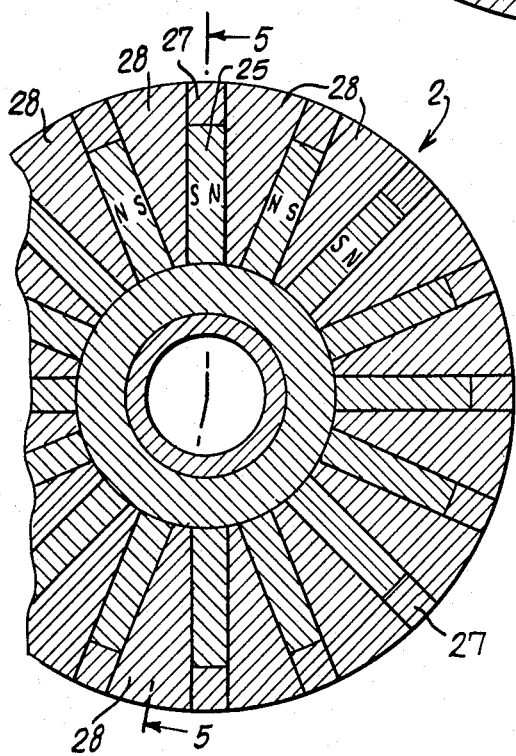
FIG. 4 is a sectional view taken on the line 4—4 of FIG. 5, being substantially the same as line 3—3 of FIG. 2, showing the rotor construction on the same scale as FIG. 2.
Figure 5:
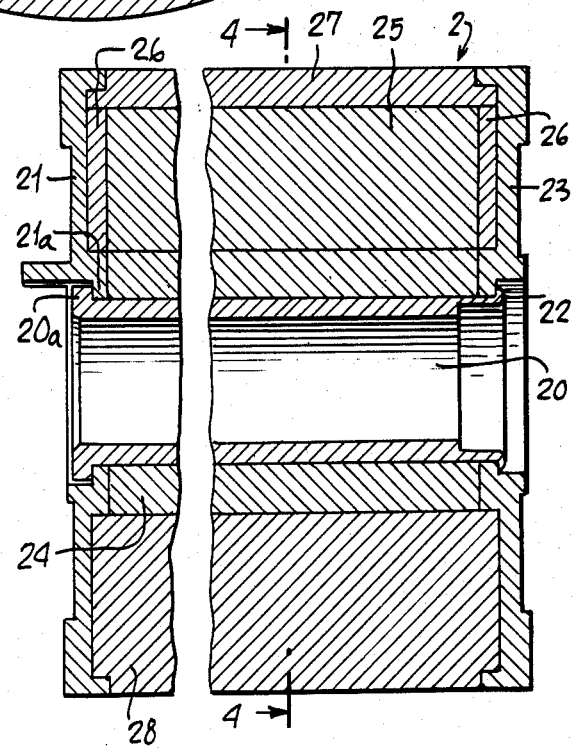
FIG. 5 is a sectional view taken on the line 5—5 of FIG. 4.

These figures illustrate an alternator including a stator generally indicated at 1, and shown in detail in FIGS. 2 and 3, and a rotor generally indicated at 2 and shown in detail in FIGS. 2, 4 and 5.

The stator 1 comprises two annular back shunts 3 and 4 of magnetic material, preferably not laminated, and a stack 5 of annular laminations having radially inwardly projecting teeth 6. The shunt 4 is L-shaped in radial cross section, and the end of the lateral arm 4a of the L-shaped shunt abuts against the margin of the shunt 3, so that the shunts 3 and 4 together define a shunt structure having a U-shaped cross section.

The stack 5 is separated into two sections 5a and 5b by a non-magnetic spacer 9. The sections 5a and 5b and the spacer 9 are held together by a plurality of elongated rivets, one of which is shown at 13, which also fasten the stack 5 to a base plate 14.

The back shunts 3 and 4 are held together by a plurality of bolts, one of which is shown at 17.

A plurality of bolts 15 hold the base plate 14 and shunt 3 assembled and mounted on a suitable support 16, which may be part of the housing of the alternator.

Each tooth 6 of the stator comprises a set of two parallel radial branches 6a and 6b, corresponding to the two stack sections 5a and 5b. Each pair of branches 6a and 6b are connected at their radially inner ends by a stator bar 7, which may be laminated. The arm 4a may extend continuously around the periphery of the stator, or it may be interrupted by one or more apertures between the radially extending parts of the back shunts 3 and 4. An annular control winding 8 encircles the rotor 2, being located between the parallel back shunts 3 and 4 of the stator teeth. The control winding 8 is provided with suitable terminals 10 through which it may be energized. Output windings 11 and 12 are provided on each of the radial branches 6a and 6b. Alternatively a single output winding may encircle each pair of radial branches 6a and 6b.

The branches 6a and 6b collectively provide two parallel circumferential rows of radial branches.

The back shunts 3 and 4, taken together with the annular portion of the stack 5, constitute an annular magnetic circuit means. The annular magnetic circuit means, taken together with the teeth 6, define a magnetic return circuit for the flux from the rotor poles. Each pair of teeth 6a and 6b with the connecting lateral arm 4a and the connecting stator bar 7, define a magnetic loop circuit encircling the control winding 8. Current flowing in the control winding 8 acts in the same direction as the flux from the rotor pole in one of the two teeth 6a and 6b, and acts in the opposite direction to the rotor pole flux in the other tooth. The tooth where the two fluxes act in the same direction may become saturated, but the tooth where the two fluxes act in opposing directions does not become saturated. Hence, there is always available an unsaturated magnetic return circuit extending from any rotor pole through an adjacent stator tooth and around one or the other or both adjoining portions of the annular magnetic circuit means to the next adjacent stator tooth, and thence to the rotor pole of opposite polarity. This magnetic return circuit comprises a plurality of parallel flux paths which are interrupted only at the air gaps. Control is preferably accomplished by saturating some, but not all, of the parallel flux paths. If desired, the control may be extended to saturate effectively all the flux paths.

FIGS. 4–5

The rotor 2 comprises a central sleeve 20 adapted for mounting on a suitable shaft and having a flange 20a at one end to retain an end plate 21 by engagement with a mating flange 21a on the inner periphery of the end plate. The opposite end of the sleeve 20 is made thinner so that it may readily be deformed, as by cold-heading, as shown at 22, to engage a flange on an opposite end plate 23. Between the end plates 21 and 23 there is clamped an annular cylindrical base member 24, of non-magnetic material. A plurality of permanent magnets 25 abut against the cylindrical outer surface of the base member 24. These permanent magnets 25 may be of barium ferrite or samarium cobalt, or any other material which is capable of attaining an equivalent high coercive force. These materials are mechanically weak in tension. Furthermore, since they are very hard, it is difficult to modify their dimensions. Permanent magnets 25 of the materials mentioned are readily available in shapes of rectangular cross section. In the arrangement shown, one of the narrow flat sides of each magnet 25 is tangential to the cylindrical base member 24. The force holding the parts assembled is thereby concentrated at the line of tangency along the middle of the flat surface. Nevertheless, no undesirable stress concentration results, since the centrifugal force acting on the magnets tends to separate them from the base member 24 rather than to hold them against it. Alternatively, it would be possible to insert between each magnet 25 and the base member 24 a spacer of malleable material having one arcuate surface adapted to engage the cylindrical surface of the base member 24 and an opposite flat surface adapted to engage the flat surface on the magnet 25.

In the arrangement shown, non-magnetic spacers 26 are provided at each end of each magnet 25, between it and the end plates 21 and 23. These spacers are of relatively malleable material, so that they yield to accommodate differences in dimensions of the magnets 25. A non-magnetic retainer bar 27 is provided radially outward from each magnet 25. The magnets are separated circumferentially of the rotor 2 by segments 28 of magnetically permeable material. The end plates 21 and 23 are rolled over shoulders on the retainer bars 27 and on the segments 28, as shown in FIG. 5. The bars 27 and segments 28 are made slightly oversize, and after assembly, the periphery of the rotor is machined to provide a smooth circumferential surface. The radially outer ends of the segments 28 serve as the pole faces of the rotor.

FIGS. 6–8

Figure 6:
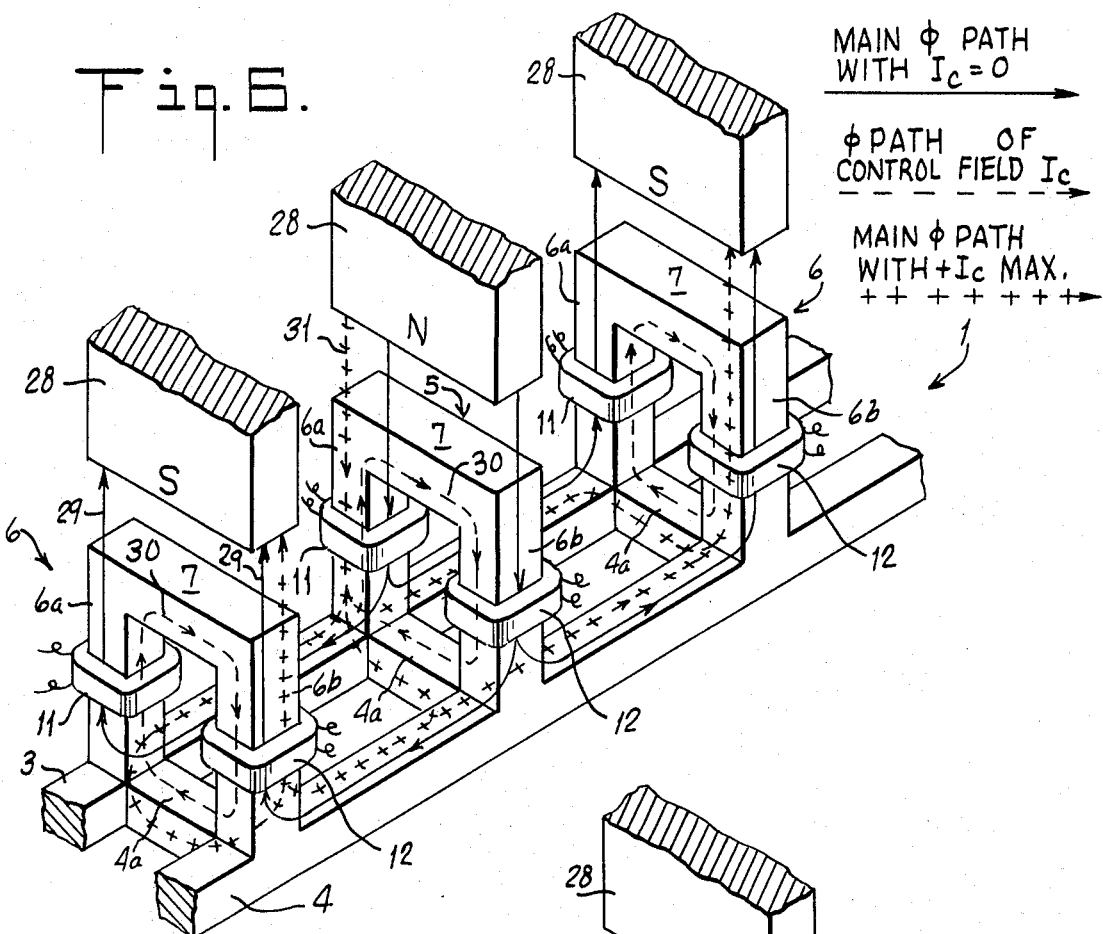
FIG. 6 is a diagrammatic perspective view showing the various flux paths involved in the operation of the alternator of FIGS. 1 to 5.
Figure 7:
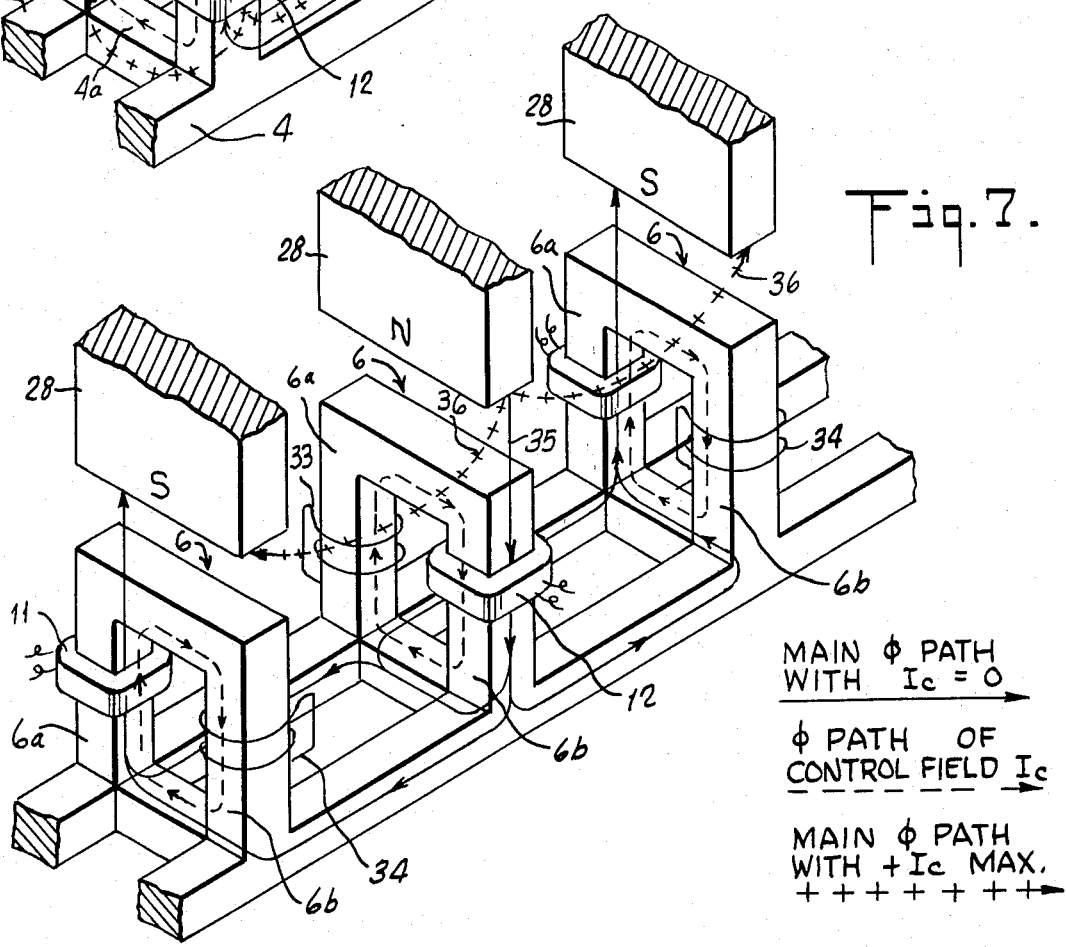
FIG. 7 is a view similar to FIG. 6, showing a modified winding arrangement, and the flux paths associated therewith.
Figure 8:
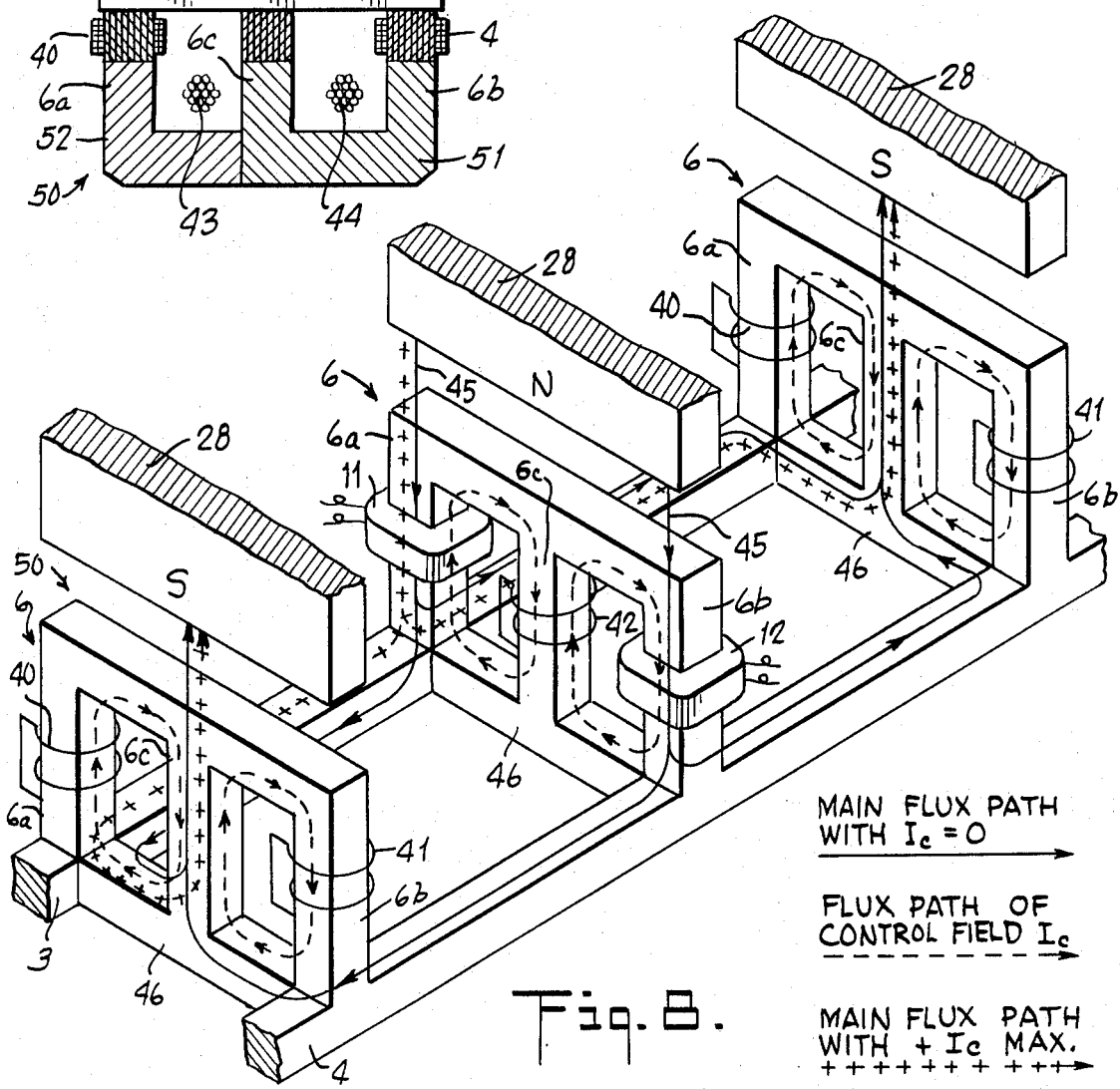
FIG. 8 is a view similar to FIGS. 6 and 7, showing a modified stator structure.

Elements in FIGS. 6–8 which are the functional counterparts of elements in FIGS. 1–5 have been given the same reference numerals, even though they may be shown, for convenience of illustration, in a somewhat different form.

FIG. 6

This figure illustrates diagrammatically the magnetic circuit elements in the stator 1. A fragment of the stator 1 is shown straightened out and expanded to illustrate three adjacent teeth 6 on the stator. The middle tooth 6 is shown as being adjacent a north pole 28 and the end teeth 6 are shown as being adjacent two south poles.

The control winding 8 is not shown in FIG. 6, to simplify the drawing.

The flux path 29, due to the rotor field when there is no current $I_c$ in the control winding, is shown in FIG. 6 by full lines, which extend downwardly from the center north pole 28 and branch to the left and right, returning upwardly through the radial branches 6a and 6b of the stator teeth. The ends of the teeth 6 remote from the pole 28, are shown in this figure as connected by two parallel bars 3 and 4. The bars 3 and 4 correspond to the back shunts 3 and 4, and parallel parts of the stack 5, in FIGS. 1 and 2. The space between the bars 3 and 4 may be completely filled in with magnetic material without affecting the operation of the alternator. The ends of the radial branches 6a and 6b are connected by stator bars 7. The outer ends of the radial branches 6a and 6b are connected by a web member 4a, corresponding to lateral arm 4a in FIG. 2. All of the radial branches 6a and 6b carry output windings 11 and 12.

When no current is flowing in the control winding, the rotation of rotor 2 produces an alternating magnetic flux in each of the stator teeth 6, which in turn induces an alternating current in all the windings 11 and 12, which may be connected in series, or parallel, or otherwise, as desired.

When a unidirectional control current $I_c$ flows in the control winding 8, if it is assumed that the current flows from left to right as viewed in FIG. 6, there is produced a unidirectional magnetic flux flowing in the paths indicated by the dotted line 30. Each path 30 is a closed loop extending upwardly through a branch 6a, across a stator bar 7, downwardly through a branch 6b and then across a web 4a to complete the loop. Note that in the branches 6a under the south poles, the flux 30 due to the control winding 8 is flowing in the same direction as the flux 29 due to the rotor field. The same condition prevails in the branch 6b under the north pole. On the other hand, in the branches 6b under the south poles and in the branches 6a under the north pole, the flux due to the control winding opposes the flux due to the rotor field.

The radial branches 6a and 6b are designed with respect to their size and flux permeability so that they may become saturated by the flux due to the current in the field winding 8 and the flux due to the rotating magnetic field of the rotor, wherever those fluxes are acting in the same direction in a particular radial branch 6a and 6b. On the other hand, the stator bars 7 and the webs 4a are made large enough so that they do not saturate.

It is possible to vary the saturation of the radial branches 6a and 6b by varying the current flow through the control winding 8, in such a way as to modify the voltage and current induced in the output windings 11 and 12. For example, assume that the middle radial branch 6b and the end radial branch 6a are all completely saturated, because they are both carrying a control winding flux in the same direction as the field flux. The field flux must then seek a more complex path between the middle north pole 28 and the end south poles 28. That more complex path is indicated by a line 31 of crosses in the drawing. It proceeds from the center north pole 28 downwardly through the leg 6a, and then may go along the bar 3 to the next web member 4a where it may cross over to the foot of one of the radial branches 6b under a south pole and then up through that radial branch to the adjacent south pole. The flux may alternatively proceed from the bottom of leg 6a, across the middle web member 4a, and there divides and flows along the annular member 4 in one direction or the other until it encounters a radial branch 6b under a south pole. It then flows up through that branch to the south pole.

Of course, in any physical stator structure, the radial branches are never completely saturated. Note also that the flux path alternates as the rotor rotates, shifting from one set of radial branches 6a and 6b to another each time the poles of alternate polarity pass the teeth of the stator.

FIG. 7

This figure illustrates a modification of the stator of FIG. 6, in which the output winding 11 is omitted from the center tooth 6 and is replaced by a short-circuited coil 33. Similarly, on the teeth 6 under the south poles, the output windings 6b are replaced by short-circuited coils 34. These short-circuited coils 33 and 34 effectively block the passage of alternating flux from the rotor through their respective radial branches. The short-circuited coils 33 and 34 do not affect the path of the flux due to the current in the control winding, since that current is always flowing in the same direction. The short-circuited coils have the effect of delaying slightly any change in that current, but their steady state effect on that current, as opposed to their transient effect, may be regarded as zero.

With this arrangement of short-circuited coils 33 and 34, the main flux path for the rotor flux when the control winding current is zero now follows a complex path shown by the line 35 in the drawing. Now, if the control field winding 8 is energized, the radial branches 6a of the end teeth and the radial branch 6b of the middle tooth become saturated, thereby effectively blocking all of the rotor flux from the stator. The flux passing between the north pole 28 and the south poles must then be substantially all leakage flux moving along air paths as indicated at 36.

The arrangement shown in FIG. 7 has an advantage over that shown in FIG. 6, in that the arrangement shown in FIG. 7 can be controlled to a condition of substantially complete saturation of the stator, so that the alternator output can be reduced to substantially zero. On the other hand, the modification of FIG. 6 has the advantage that the maximum effective reluctance of the flux path is less than in FIG. 7.

FIGS. 8–9

These figures illustrate a modified stator structure which provides better regulation of the output than the arrangement in FIG. 6, and also provides a lower reluctance flux path in the saturated condition than does the arrangement of FIG. 7. In FIG. 8, each tooth 6 has a middle branch 6c parallel to the outer branches 6a and 6b, and thus has a set of three parallel radial branches. The outer branches 6a and 6b of the end teeth 6 are provided with short-circuited coils 40 and 41, respectively. The middle radial branch 5c of the center tooth 6 is also provided with a short-circuited coil 42. Output windings are provided only on the end radial branches 6a and 6b of the middle tooth 6. Alternatively, output windings may be added to the middle radial branches 6c of the alternate teeth 6 under the south poles.

Figure 9:
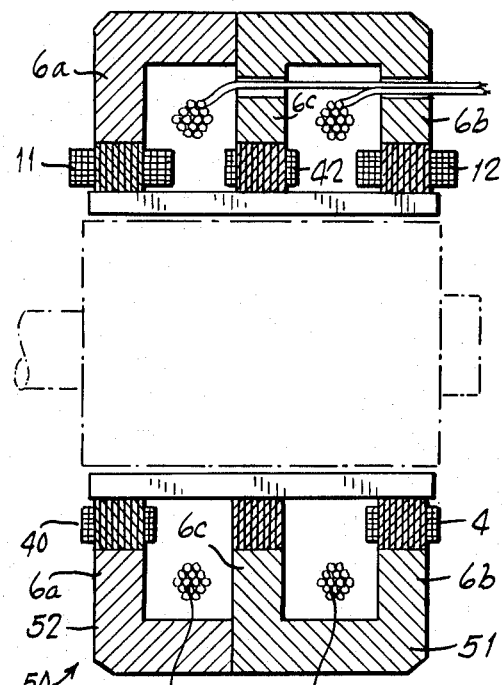
FIG. 9 is a view similar to FIG. 2, illustrating the details of the stator structure shown diagrammatically in FIG. 8.

The physical structure involved is shown more completely in FIG. 9. It may there be seen that two control windings 43 and 44 are provided. The control winding 42 lies between the parallel branches 6a and the parallel branches 6c. Control winding 43 is located between the branches 6c and the parallel branches 6b.

When no current is flowing in the control windings 43 and 44, then the flux due to the rotor field follows the path indicated at 45 in FIG. 8, passing down through the end branches 6a and 6b under the north pole 28, along the parallel bars 3 and 4, through web members 46 and out through the middle radial branches 6c under the south poles 28. When a control field is added by current flowing through the windings 43 and 44, the leg 6b under the north pole 28 becomes saturated, but the leg 6a does not. Hence, a continuous flux path is provided for the rotor flux, although the effective reluctance of that path is substantially increased as the current is increased in the control windings 43 and 44. There is no other change in the reluctance of the flux path for the rotor flux, due to any change in the control field.

As shown in FIG. 9, the stator of FIG. 8 is generally indicated by the reference numeral 50. It consists of a U-shaped back shunt ring 51, with an L-shaped back shunt ring abutting one side of the U-shaped back shunt ring. There are thus provided parallel radial branches 6a, 6b and 6c. On alternate sets of radial branches, there are provided output windings 11 and 12 on the outer branches 6a and 6c, as shown at the top of FIG. 9 and a short-circuited coil 42 on the middle branch 6c. This is the same as the middle tooth 6 in FIG. 8. On the other alternate sets of teeth 6, as shown at the bottom of FIG. 9, there are provided short-circuited windings 40 and 41 on the branches 6a and 6b, and no winding at all on the center branch 6c. This is the same as the two end teeth 6 in FIG. 8.

We claim:

1. An alternator, comprising:
    a. a permanent magnet rotor having peripheral poles alternately of opposite polarities; and
    b. a stator cooperating with said rotor and including:
        1. annular magnetic circuit means;
        2. a plurality of tooth means projecting radially inwardly from the annular means;
        3. output winding means; and
        4. control winding means; wherein the improvement comprises:
    c. each said tooth means comprises a set of at least two parallel axially spaced radial branches and a pair of branches parallel to the rotor axis and connecting the ends of the parallel axially spaced radial branches, said sets of radial branches defining at least two axially spaced circumferential rows of radial branches;
    d. the radial branches cooperate with at least a portion of the annular magnetic circuit means to define a magnetic return circuit for flux emanating from the poles on the rotor;
    e. said output winding means includes output windings encircling at least some of the radial branches;
    f. said control winding means extend circumferentially of the stator between the two rows of parallel axially spaced radial branches, so that each pair of axially spaced radial branches and their connecting branches define one of a plurality of magnetic loop circuits for flux produced by said control winding means; and
    g. each set of radial branches is connected in both said magnetic return circuit and in one of said loop circuits; each radial branch being subject to an alternating magnetomotive force during rotation of the rotor, said alternating magnetomotive force being effective to produce alternating flux in at least some of the radial branches, each set of radial branches being subject to a unidirectional magnetomotive force when unidirectional current flows in the control winding, said unidirectional magnetomotive force being effective to produce unidirectional flux in the loop circuits which acts in opposite radial directions in two branches of the set, said radial branches being dimensioned to be saturable by the sum of the return circuit flux and the loop circuit flux, so that an increase of said direct current in the control winding is effective to increase the flux in at least some of the radial branches and thereby to saturate said branches and increase the effective reluctance of the magnetic return circuit, reducing the flux therein and the current induced thereby in said output winding.

2. An alternator as defined in claim 1, in which there are only two parallel radial branches in each set.

3. An alternator as defined in claim 2, in which said output winding means comprises a coil on each of the radial branches.

4. An alternator as defined in claim 2, including:
    a. short-circuited windings on one radial branch of each set, and on alternate radial branches of each circumferential row.

5. An alternator as defined in claim 1, in which:
    a. said tooth means comprises three radial branches in each set; and
    b. said control winding means includes two windings, each extending circumferentially of the stator and located between two circumferential rows of radial branches.

6. An alternator as defined in claim 5, including a short-circuited coil on the center branch of alternate sets of radial branches, and on both end branches of the other sets.

7. An alternator as defined in claim 6, in which said output winding means comprises output coils only on the end branches of sets whose center branch carries a short-circuited winding.

8. An alternator as defined in claim 1, in which said rotor comprises:
    a. a central cylindrical support member;
    b. a plurality of circumferentially spaced permanent magnets, which are polarized with their poles directed circumferentially, and alternately in opposite directions;

c. a plurality of magnetically permeable segments between said magnets and projecting radially outward beyond said magnets;

d. a plurality of non-magnetic retaining bars, one located radially outward from each magnet and circumferentially aligned with said segments; and e. means to hold the magnets, the segments and the retaining bars in place on the support member, including a pair of end plates fixed on said fixed central cylindrical support member and having their peripheral margins engaging shoulders on said segments and retaining bars.

9. An alternator as defined in claim 8, in which said support member is hollow and includes a central sleeve extending through said support member and said end plates, said sleeve having a shoulder at one end abutting against one of said end plates and having its opposite end deformed to engage the outside of the other end plate, to hold the rotor assembled.

10. A rotor for a permanent magnet alternator, comprising:
a. a central cylindrical support member;
b. a plurality of circumferentially spaced permanent magnets, which are polarized with their poles directed circumferentially, and alternately in opposite directions;
c. a plurality of magnetically permeable segments between said poles and projecting radially outward beyond said poles;
d. a plurality of non-magnetic retaining bars, one located radially outward from each pole and circumferentially aligned with said segments; and
e. means to hold the magnets, the segments and the retaining bars in place on the support member, including a pair of end plates fixed on said central cylindrical support member and having their peripheral ends engaging said segments and retaining bars.

11. A rotor as defined in claim 10, in which said magnets are axially shorter than said retaining bars, and including spacer means of malleable material between the end plates and the magnets and retained by said retaining bars.

12. An alternator, comprising:
a. a permanent magnet rotor having peripheral poles alternately of opposite polarities; and
b. a stator cooperating with said rotor and including:
1. annular magnetic circuit means;
2. a plurality of tooth means projecting radially inwardly from the annular means, each tooth means terminating at a tip separated from the stator periphery by an air gap;
3. output winding means; and
4. control winding means;

wherein the improvement comprises:
c. means, including at least some of said tooth means and at least a portion of said annular magnetic circuit means, defining magnetic return circuits for flux emanating from the poles on the rotor, each said tooth means in one of said magnetic return circuits comprising at least two magnetically parallel axially spaced branches for flux from each rotor pole, each said magnetic return circuit being continuously of magnetically permeable material from a tooth tip adjacent one rotor pole to a tooth tip adjacent a rotor pole of opposite polarity;
d. means, including said control winding means, for inducing unidirectional flux flowing in opposite directions through said parallel branches, and effective to vary in opposite senses the saturation in said branches and thereby to change the distribution of said rotor flux between said branches; and
e. said output winding means including windings en-circling at least some of said parallel branches.

* * * * *